US012028898B2

United States Patent
Wang et al.

(10) Patent No.: US 12,028,898 B2
(45) Date of Patent: Jul. 2, 2024

(54) UE, RADIO NETWORK NODE AND METHODS PERFORMED THEREIN FOR HANDLING COMMUNICATION

(71) Applicant: Telefonaktiebolaget LM Ericsson (publ), Stockholm (SE)

(72) Inventors: Min Wang, Luleå (SE); Jinhua Liu, Beijing (CN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 291 days.

(21) Appl. No.: 17/438,053

(22) PCT Filed: Mar. 10, 2020

(86) PCT No.: PCT/SE2020/050261
§ 371 (c)(1),
(2) Date: Sep. 10, 2021

(87) PCT Pub. No.: WO2020/190194
PCT Pub. Date: Sep. 24, 2020

(65) Prior Publication Data
US 2022/0150967 A1 May 12, 2022

(30) Foreign Application Priority Data

Mar. 18, 2019 (WO) ................ PCT/CN2019/078557

(51) Int. Cl.
*H04W 74/0816* (2024.01)
*H04W 24/10* (2009.01)
(Continued)

(52) U.S. Cl.
CPC ....... *H04W 74/0816* (2013.01); *H04W 24/10* (2013.01); *H04W 72/0446* (2013.01); *H04W 74/004* (2013.01); *H04W 74/0866* (2013.01)

(58) Field of Classification Search
CPC ............. H04W 74/0816; H04W 24/10; H04W 72/0446; H04W 74/004; H04W 74/0866
See application file for complete search history.

(56) References Cited

U.S. PATENT DOCUMENTS

2018/0288790 A1 10/2018 Kim et al.
2019/0364581 A1* 11/2019 Anderson ......... H04W 72/1268
(Continued)

FOREIGN PATENT DOCUMENTS

| CN | 107660344 A | 2/2018 |
| CN | 108702779 A | 10/2018 |

(Continued)

OTHER PUBLICATIONS

"WF on CWS adjustment for AUL with HARQ-ACK reception", 3GPP TSG RAN1 #91, R1-1721269, Huawei, HiSilicon, Ericsson, Intel, Nokia, Nokia Shanghai Bell, CableLabs, WILUS, Broadcom, Reno, USA, Nov. 27-Dec. 1, 2017, 3 pages.
(Continued)

*Primary Examiner* — Donald L Mills
(74) *Attorney, Agent, or Firm* — Murphy, Bilak & Homiller, PLLC

(57) ABSTRACT

Embodiments herein relate e.g. to a method performed by a user equipment, UE, (10) for handling communication in a wireless communication network. The UEa radio network 5 adjusts a value of the CW based on a determined response, from node (12), of an uplink, UL, control channel transmission.

17 Claims, 11 Drawing Sheets

(51) Int. Cl.
*H04W 72/0446* (2023.01)
*H04W 74/00* (2009.01)
*H04W 74/08* (2009.01)

(56) References Cited

U.S. PATENT DOCUMENTS

| | | | | |
|---|---|---|---|---|
| 2022/0109532 A1* | 4/2022 | Talarico | ................ | H04L 5/0055 |
| 2022/0131648 A1* | 4/2022 | El Hamss | ............. | H04L 1/1812 |
| 2022/0312481 A1* | 9/2022 | Talarico | ............ | H04W 72/0446 |

FOREIGN PATENT DOCUMENTS

| | | | |
|---|---|---|---|
| KR | 20170111643 A | 10/2017 | |
| WO | 2017069798 A1 | 4/2017 | |
| WO | 2017171456 A1 | 10/2017 | |
| WO | 2020190194 A1 | 9/2020 | |

OTHER PUBLICATIONS

3GPP, "3GPP TS 36.213 V15.1.0", 3rd Generation Partnership Project; Technical Specification Group Radio Access Network; Evolved Universal Terrestrial Radio Access (E-UTRA); Physical layer procedures (Release 15), Mar. 2018, 1-499.

3GPP, "3rd Generation Partnership Project; Technical Specification Group Radio Access Network; Study on NR-based access to unlicensed spectrum (Release 16)", 3GPP TR 38.889 V16.0.0, Dec. 2018, 1-119.

LG Electronics, "Channel access procedure for NR-U", 3GPP TSG RAN WG1 Meeting #96, R1-1902040, Athens, Greece, Feb. 25-Mar. 15, 2019, 1-14.

Nokia, et al., "Feature Lead's Summary #2 on Channel Access Procedures", 3GPP TSG RAN WG1 Meeting #96, R1-1903705, (R1-1903499), Athens, Greece, Feb. 25-Mar. 1, 2019, 1-23.

Nokia, et al., "Remaining Issues on Channel Access for LAA UL", 3GPP TSG RAN WG1 Meeting #86, R1-167626, Gothenburg, Sweden, Aug. 22-26, 2016, 1-6.

* cited by examiner

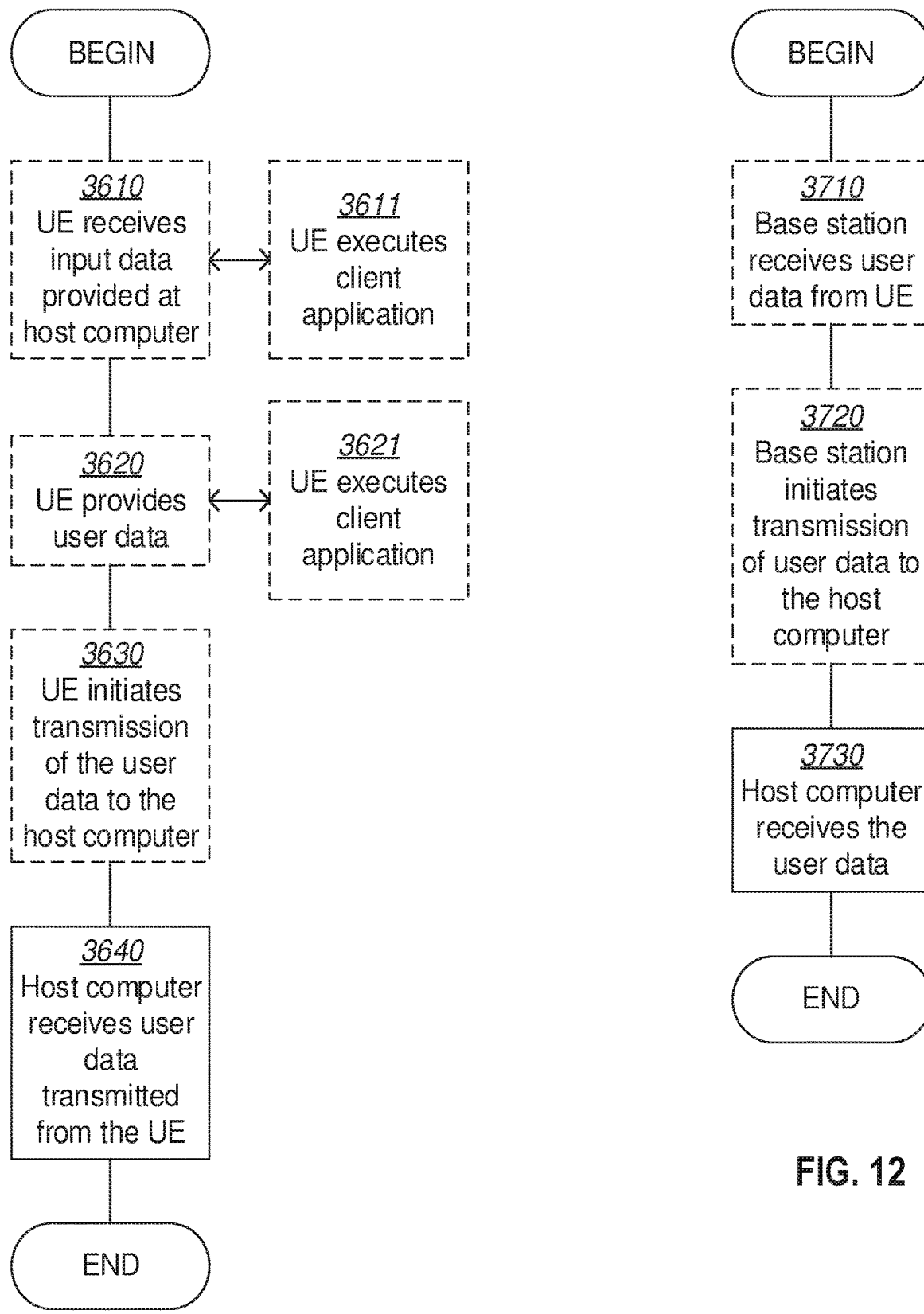

UE, RADIO NETWORK NODE AND METHODS PERFORMED THEREIN FOR HANDLING COMMUNICATION

TECHNICAL FIELD

Embodiments herein relate to a user equipment (UE), a radio network node and methods performed therein regarding wireless communication. Furthermore, a computer program product and a computer readable storage medium are also provided herein. In particular, embodiments herein relate to handling communication, such as handling, controlling and/or managing access, in a wireless communications network.

BACKGROUND

In a typical wireless communications network, user equipment (UE), also known as wireless communication devices, mobile stations, stations (STA) and/or wireless devices, communicate via a Radio Access Network (RAN) with one or more core networks (CN). The RAN covers a geographical area which is divided into service areas or cell areas, with each service area or cell area being served by a radio network node such as an access node e.g. a Wi-Fi access point or a radio base station (RBS), which in some networks may also be called, for example, a NodeB, a gNodeB, or an eNodeB. The service area or cell area is a geographical area where radio coverage is provided by the radio network node. The radio network node operates on radio frequencies to communicate over an air interface with the UEs within range of the radio network node. The radio network node communicates over a downlink (DL) to the UE and the UE communicates over an uplink (UL) to the radio network node.

A Universal Mobile Telecommunications System (UMTS) is a third generation telecommunication network, which evolved from the second generation (2G) Global System for Mobile Communications (GSM). The UMTS terrestrial radio access network (UTRAN) is essentially a RAN using wideband code division multiple access (WCDMA) and/or High-Speed Packet Access (HSPA) for communication with user equipment. In a forum known as the Third Generation Partnership Project (3GPP), telecommunications suppliers propose and agree upon standards for present and future generation networks and UTRAN specifically, and investigate enhanced data rate and radio capacity. In some RANs, e.g. as in UMTS, several radio network nodes may be connected, e.g., by landlines or microwave, to a controller node, such as a radio network controller (RNC) or a base station controller (BSC), which supervises and coordinates various activities of the plural radio network nodes connected thereto. The RNCs are typically connected to one or more core networks.

Specifications for the Evolved Packet System (EPS) have been completed within the 3GPP and this work continues in the coming 3GPP releases, such as 4G and 5G networks such as New Radio (NR). The EPS comprises the Evolved Universal Terrestrial Radio Access Network (E-UTRAN), also known as the Long-Term Evolution (LTE) radio access network, and the Evolved Packet Core (EPC), also known as System Architecture Evolution (SAE) core network. E-UTRAN/LTE is a 3GPP radio access technology wherein the radio network nodes are directly connected to the EPC core network. As such, the Radio Access Network (RAN) of an EPS has an essentially "flat" architecture comprising radio network nodes connected directly to one or more core networks.

With the emerging 5G technologies such as new radio (NR), the use of very many transmit- and receive-antenna elements is of great interest as it makes it possible to utilize beamforming, such as transmit-side and receive-side beamforming. Transmit-side beamforming means that the transmitter can amplify the transmitted signals in a selected direction or directions, while suppressing the transmitted signals in other directions. Similarly, on the receive-side, a receiver can amplify signals from a selected direction or directions, while suppressing unwanted signals from other directions.

Next generation systems are expected to support a wide range of use cases with varying requirements ranging from fully mobile devices to stationary IoT or fixed wireless broadband devices. The traffic pattern associated with many use cases may be expected to consist of short or long bursts of data traffic with varying length of waiting period in between, here called inactive state. In NR, both license assisted access and standalone unlicensed operation are to be supported. Hence the procedure of Physical Random Access Channel (PRACH) transmission and/or Scheduling Request (SR) transmission in unlicensed spectrum may be investigated in 3GPP. In the following, NR-unlicensed spectrum and channel access procedure for an unlicensed channel based on listen before talk (LBT) is introduced and LBT scheme for PRACH and Physical Uplink Control Channel (PUCCH) may be introduced as a basis to address the solutions.

In order to tackle with the ever increasing data demanding, NR is considered both licensed and unlicensed spectrum. The standardization work for licensed spectrum in Rel-15 is still on-going. 3GPP has defined a study item on NR-based Access to Unlicensed Spectrum was approved at RAN-77. At this study item, compared to the LTE Licensed assisted access (LAA), NR unlicensed spectrum (NR-U) also need to support dual connectivity (DC) and standalone scenarios, where the medium access control (MAC) procedures including random access channel (RACH) and scheduling procedure on unlicensed spectrum are subject to the LBT failures, while there was no such restriction in LTE LAA, since there was licensed spectrum in LAA scenario so the RACH and scheduling related signaling can be transmitted on the licensed spectrum instead of unlicensed spectrum.

For discovery reference signal (DRS) transmission such as primary synchronization signal (PSS) and/or secondary synchronization signal (SSS), physical broadcast channel (PBCH), channel state information reference signal (CSI-RS), control channel transmission such as PUCCH and/or physical downlink control channel (PDCCH), physical data channel such as physical uplink shared channel (PUSCH) and/or physical downlink shared channel (PDSCH), and uplink sounding reference signal (SRS) such as SRS transmission, channel sensing should be applied to determine the channel availability before the physical signal is transmitted using the channel.

The radio resource management (RRM) procedures in NR-U would be generally rather similar as in LAA, since NR-U is aiming to reuse LAA/eLAA/feLAA technologies as much as possible to handle the coexistence between NR-U and other legacy radio access technologies (RAT). RRM measurements and report comprising special configuration procedure with respect the channel sensing and channel availability.

Hence, channel access and/or selection for LAA was one of important aspects for co-existence with other RATs such as Wi-Fi. For instance, LAA has aimed to use carriers that are congested with Wi-Fi.

In licensed spectrum, UE measures Reference Signal Received Power (RSRP), and Reference Signal Received Quality (RSRQ) of the downlink radio channel, e.g. synchronization signal block (SSB), CSI-RS, and provides the measurement reports to its serving radio network node such as eNB/gNB. However, the measurement reports don't reflect the interference strength on the carrier. Another metric Received Signal Strength Indicator (RSSI) can serve for such purpose. At the radio network node side, it is possible to derive RSSI based on the received RSRP and RSRQ reports, however, this requires that the reports must be available. Due to the LBT failure, some reports in terms of RSRP or RSRP may be blocked, can be either due to that the reference signal transmission, such as DRS, is blocked in the downlink or the measurement report is blocked in the uplink. Hence, the measurements in terms of RSSI are very useful. The RSSI measurements together with the time information concerning when and how long time that UEs have made the measurements can assist the radio network node to detect a hidden node. Additionally, the radio network node can measure the load situation of the carrier which is useful for the network to prioritize some channels for load balance and channel access failure avoidance purposes.

LTE LAA has defined to support measurements of averaged RSSI and channel occupancy for measurement reports. The channel occupancy is defined as percentage of time that RSSI was measured above a configured threshold. For this purpose, a RSSI measurement timing configuration (RMTC) includes a measurement duration, e.g. 1-ms, and a period between measurements, e.g. {40, 80, 160, 320, 640} ms.

Channel Occupancy Time (COT) sharing in NR-U.

For a network node, e.g., NR-U gNB/UE, LTE-LAA eNB/UE, or Wi-Fi AP/STA), to be allowed to transmit in unlicensed spectrum, e.g., 5 GHz band, it typically needs to perform a clear channel assessment (CCA). This procedure typically includes sensing the medium to be idle for a number of time intervals. Sensing the medium to be idle can be done in different ways, e.g. using energy detection, preamble detection or using virtual carrier sensing. Where the latter implies that the node reads control information from other transmitting nodes informing when a transmission ends. After sensing the medium to be idle, the network node is typically allowed to transmit for a certain amount of time, sometimes referred to as transmission opportunity (TXOP). The length of the TXOP depends on regulation and type of CCA that has been performed, but typically ranges from 1 ms to 10 ms. This duration is often referred to as a COT.

In Wi-Fi, feedback of data reception acknowledgements (ACK) is transmitted without performing clear channel assessment. Preceding feedback transmission, a small time duration, called Short Inter-Frame Space (SIFS), is introduced between the data transmission and the corresponding feedback which does not include actual sensing of the channel. In 802.11, the SIFS period, e.g. 16 μs for 5 GHz OFDM PHYs, is defined as:

$$aSIFSTime=aRxPHYDelay+aMACProcessingDelay+ aRxTxTurnaroundTime$$

aRxPHYDelay defines the duration needed by the physical (PHY) layer to deliver a packet to the MAC layer, aMACProcessingDelay defines the duration that the MAC layer needs to trigger the PHY layer transmitting a response, and aRxTxTurnaroundTime defines the duration needed to turn the radio from reception into transmit mode.

Therefore, the SIFS duration is used to accommodate for the hardware delay to switch the direction from reception to transmission.

It is anticipated that for NR in unlicensed bands, i.e. NR-U, a similar gap to accommodate for the radio turn-around time will be allowed. For example, this will enable the transmission of PUCCH carrying uplink control information (UCI) feedback as well as PUSCH carrying data and possible UCI within the same transmit opportunity (TXOP) acquired by the initiating gNB without the UE performing clear channel assessment before PUSCH/PUCCH transmission as long as the gap between DL and UL transmission is less than or equal to 16 us. Operation in this manner is typically called "COT sharing." An example on COT sharing is illustrated in FIG. 1. FIG. 1 shows Transmission opportunities (TXOP) both with and without COT sharing where CCA is performed by the initiating node, e.g. a gNB. For the case of COT sharing the gap between DL and UL transmission is less than 16 us.

Channel Access Procedure in NR-U.

Listen-before-talk (LBT) is designed for unlicensed spectrum co-existence with other RATs. In this mechanism, a radio device applies a clear channel assessment (CCA) check, i.e. channel sensing, before any transmission. The transmitter involves energy detection (ED) over a time period compared to a certain energy detection threshold (ED threshold) in order to determine if a channel is idle. In case the channel is determined to be occupied, the transmitter performs a random back-off within a contention window before next CCA attempt. In order to protect the acknowledged (ACK) transmissions, the transmitter must defer a period after each busy CCA slot prior to resuming back-off. As soon as the transmitter has grasped access to a channel, the transmitter is only allowed to perform transmission up to a maximum time duration, namely, the maximum channel occupancy time (MCOT). For quality of service (QoS) differentiation, a channel access priority based on the service type has been defined. For example, there are four LBT priority classes defined for differentiation of channel access priorities between services using contention window size (CWS) and MCOT duration.

As described in 3GPP TR 38.889 v 16.0.0 [1], the channel access schemes for NR-based access for unlicensed spectrum can be classified into the following categories:

Category 1: Immediate transmission after a short switching gap
  This is used for a transmitter to immediately transmit after a UL/DL switching gap inside a COT.
  The switching gap from reception to transmission is to accommodate the transceiver turnaround time and is no longer than 16 μs.
Category 2: LBT without random back-off
  The duration of time that the channel is sensed to be idle before the transmitting entity transmits is deterministic.
Category 3: LBT with random back-off with a contention window of fixed size
  The LBT procedure has the following procedure as one of its components. The transmitting entity draws a random number N within a contention window. The size of the contention window is specified by the minimum and maximum value of N. The size of the contention window is fixed. The random number N is used in the LBT procedure to determine the duration of time that the channel is sensed to be idle before the transmitting entity transmits on the channel.

Category 4: LBT with random back-off with a contention window of variable size

The LBT procedure has the following as one of its components. The transmitting entity draws a random number N within a contention window. The size of contention window is specified by the minimum and maximum value of N. The transmitting entity can vary the size of the contention window when drawing the random number N. The random number N is used in the LBT procedure to determine the duration of time that the channel is sensed to be idle before the transmitting entity transmits on the channel.

For different transmissions in a COT and different channels and/or signals to be transmitted, different categories of channel access schemes can be used.

Contention window size (CWS) adjustment procedure for uplink transmission.

In the existing LTE spec 36.213 v15.1.0 [2], clause 15.2.2, the procedure on how to adjust the contention window (CW) is captured in case the Category 4, i.e., also referred to Type 1 channel access, channel access is chosen for uplink data transmission. We excerpt the procedure as below. A value of the CW may be understood to relate to, e.g., size of the CW. The size may be e.g., in terms of sensing slots, such as 9 us units.

if the new data indicator (NDI) value for at least one Hybrid automatic repeat request (HARQ) process associated with HARQ_ID_ref is toggled, for every priority class p⌐{1, 2, 3, 4} set $CW_p=CW_{min,p}$ otherwise, increase $CW_p$ for every priority class p∈{1, 2, 3, 4} to the next higher allowed value;

HARQ_ID_ref is the HARQ process ID of UL-SCH in reference subframe $n_{ref}$. The reference subframe $n_{ref}$ is determined as follows If the UE receives an UL grant in subframe $n_g$, subframe $n_w$ is the most recent subframe before subframe $n_g-3$ in which the UE has transmitted UL-SCH using Type 1 channel access procedure.

If the UE transmits transmissions including UL-SCH without gaps starting with subframe $n_0$ and in subframes $n_0, n_1, \ldots, n_w$, reference subframe $n_{ref}$ is subframe $n_0$, otherwise, reference subframe $n_{ref}$ is subframe $n_w$, In simple words, the CW for every priority class is reset to the minimum value if there is an ACK received for at least one of reference PUSCH transmissions, otherwise, the CW is increased to a next higher value.

In LTE LAA/eLAA/feLAA, there is no standalone unlicensed spectrum scenario meaning that the UE doesn't need to support RACH and PUCCH-SR transmissions in the unlicensed spectrum cells as secondary cells, since they can basically transmit over the licensed spectrum cells.

In the NR unlicensed access work item defined for 3GPP Rel-16, NR unlicensed operation need to support both standalone and non-standalone scenarios meaning that both RACH and PUCCH signaling need to be transmitted over unlicensed spectrum cells, since a NR-U cell may operate as a primary cell.

SUMMARY

According to the 3GPP TR 38.889 v.16.0.0 [1], clause 7.2.1.3.1:

For initiation of a COT by the UE, the channel access schemes in Table 7.2.1.3.1-4 are used.

TABLE 7.2.1.3.1-4

Channel access schemes for initiating a COT by UE as LBT device

|  | Cat 2 LBT | Cat 4 LBT |
|---|---|---|
| PUSCH (including at least UL-SCH with user plane data) | N/A except for the cases discussed in Note 2 below | Channel access priority class is selected according to the data |
| SRS-only | N/A | Cat4 with lowest channel access priority class value (as in LTE eLAA) |
| RACH-only | (see Note 2) | Cat4 with lowest channel access priority class value |
| PUCCH-only | (see Note 2) | Cat4 with lowest channel access priority class value |

Note 1:
If the COT includes multiple signals/channels with different channel access categories/priority classes, the highest channel access priority class value and highest channel access category among the channel access priority classes and channel access categories corresponding to the multiple signals/channels applies.
(Note 2):
Applicability of a channel access scheme other than Cat 4 for the following signals/channels have been discussed and details are to be determined when the specifications are developed:
UL control information including UCI only on PUSCH, e.g. HARQ-ACK, Scheduling Request, and Channel State Information;
Random Access.

The channel access on unresolved cases in the above Table is further discussed in R1-1903705 at 3GPP TSG RAN WG1 Meeting #96 [3]. Based on the discussion outcome, below conclusions have been suggested (perhaps to be agreed at upcoming meetings).

Offline Conclusion:

Cat 2 is not used for initiating a UE transmission outside of a gNB COT for the following channels/signals (or any combination of them):

PUSCH (with or without UCI),

SRS-only,

PUCCH-only

Based on above facts, it could be expected that PUCCH transmission may apply Category 4 LBT for channel access. However, the existing CWS adjustment procedure in LTE LAA is only applicable to PUSCH data transmission. It is because that the PUCCH channel is not supported in the secondary cell (SCell) in unlicensed spectrum. PUSCH signaling for SCells in unlicensed spectrum is transmitted in the primary cell (PCell) which is in licensed spectrum.

Therefore, it is necessary to study the issue and enhance the existing CW adjustment procedure for e.g. NR-U to support PUCCH transmissions in e.g. unlicensed carriers.

An object herein is to provide a mechanism to enable communication, e.g. handle or manage access to a wireless communication network, in an efficient manner in the wireless communications network.

According to an aspect the object is achieved, according to embodiments herein, by providing a method performed by a user equipment for handling communication e.g. gaining access, in a wireless communication network. The user equipment adjusts, e.g. increases or resets, a value of a CW based on a determined response, from a radio network node, of an UL control channel transmission. E.g. with the proviso that the UE receives or determines to have received, at least one response message, from the radio network node after at least one UL control transmission, of an unlicensed carrier, by the UE within a configured time period, the UE may reset a contention window size, CWS, to a first value e.g. a minimum value, otherwise, i.e. the UE does not receive or determines not to have received at least one response message from the radio network node after at least one UL control transmission by the UE within the configured time period, the CWS value may be increased to a next value such as a higher value than a current value for the CWS.

According to another aspect the object is achieved, according to embodiments herein, by providing a method performed by a radio network node for handling communication e.g. configuring UEs for gaining access, in a wireless communication network. The radio network node configures, e.g. transmitting configuration to, a user equipment, UE, configuring the UE to adjust, e.g. increase or reset, a value of a CW based on a determined response, from the radio network node, of an UL control channel transmission.

According to another aspect of embodiments herein, the object is achieved by providing a user equipment for handling communication e.g. gaining access, in a wireless communication network. The user equipment is configured to adjust, e.g. increase or reset, a value of a CW based on a determined response, from a radio network node, of an UL control channel transmission.

According to another aspect of embodiments herein, the object is achieved by providing a radio network node for handling communication e.g. configuring UEs for gaining access, in a wireless communication network. The radio network node is adapted to configure, e.g. transmit configuration to, a user equipment to adjust, e.g. increase or reset, a value of a CW based on a determined response, from the radio network node, of an UL control channel transmission.

It is furthermore provided herein a computer program product comprising instructions, which, when executed on at least one processor, cause the at least one processor to carry out the method above, as performed by the UE and the radio network node, respectively. It is additionally provided herein a computer-readable storage medium, having stored thereon a computer program product comprising instructions which, when executed on at least one processor, cause the at least one processor to carry out the method according to the method above, as performed by the UE or the radio network node, respectively.

The proposed solution gives the means on how to adjust contention window size (CWS) for uplink channel access based on outcome or impact of LBT operations on PUCCH transmissions. In e.g. an unlicensed cell which is configured with PUCCH resources, if PUCCH transmissions apply category 4 LBT, the impact of LBT operations on PUCCH transmissions would then be considered for CWS adjustment. In embodiments herein, if there is at least one response message received from the radio network node, such as a gNB, after at least one PUCCH transmissions by a UE, within a configured time period, the UE shall reset the CWS to the minimum value, otherwise, the CWS value need to be increased to next higher value.

In addition, the function of CWS adjustment based on PUCCH transmissions may be configured per cell/bandwidth part (BWP)/subband/channel within which PUCCH resource is configured. The function may also be configured per UE. The function may also be configured per channel access class/service/logical channel (LCH)/logical channel group (LCG). The function can be enabled or disabled dynamically based on monitored PUCCH load.

CWS maintenance scheme for PUCCH transmission may thus be enhanced, and/or a better fairness of channel accesses may be achieved. Embodiments herein may e.g. enable the radio network node to more efficiently control the performance of the UEs by configuring the UEs according to embodiments herein, and to more efficiently utilize the spectrum available. Hence, embodiments herein enable a communication in an efficient manner in the wireless communications network.

BRIEF DESCRIPTION OF THE DRAWINGS

Embodiments will now be described in more detail in relation to the enclosed drawings, in which:

FIG. 11 shows methods implemented in a communication system including a host computer, a base station and a user equipment in accordance with some embodiments; and FIG. 12 shows methods implemented in a communication system including a host computer, a base station and a user equipment in accordance with some embodiments.

DETAILED DESCRIPTION

Figure 1:
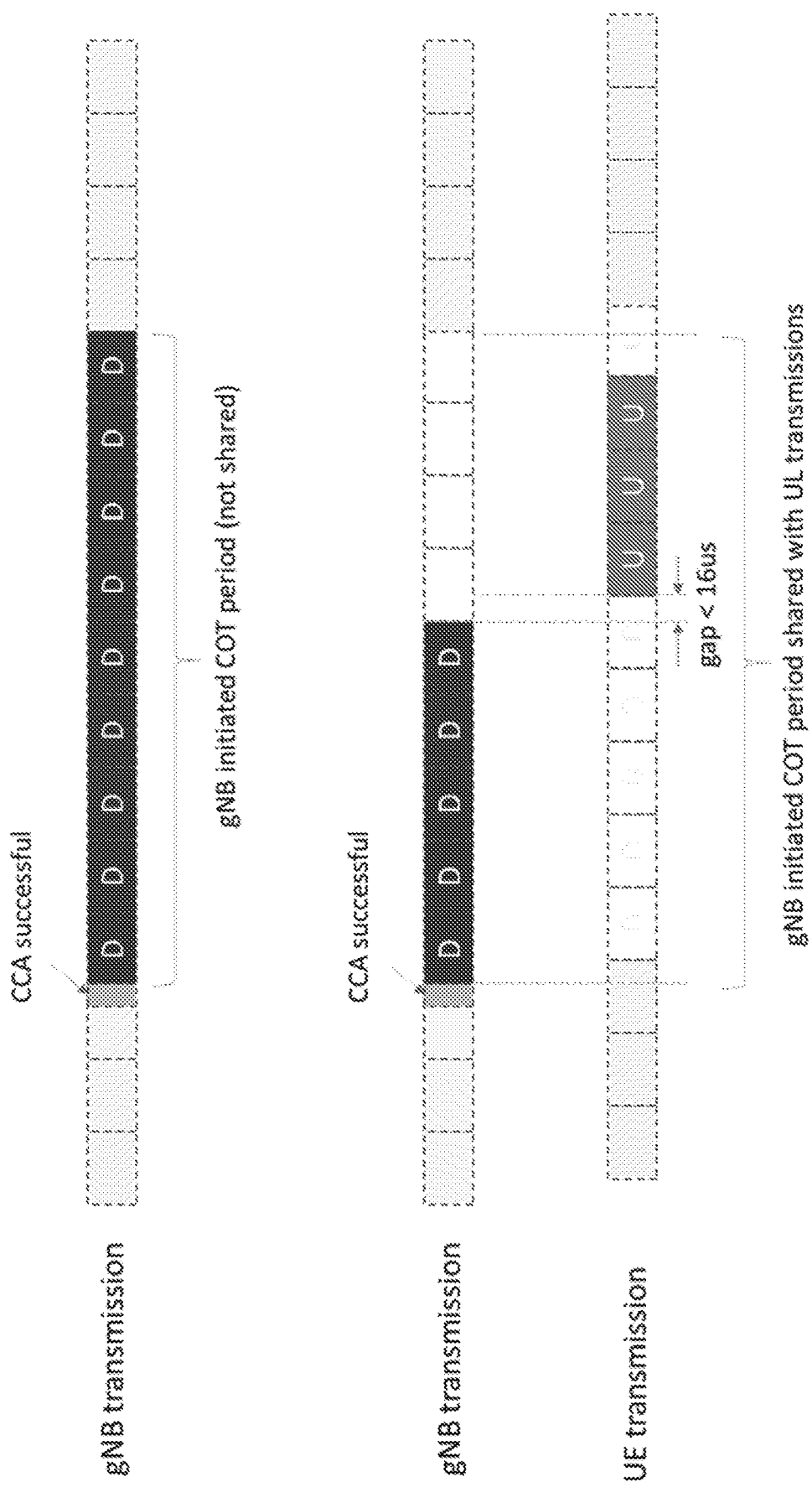
FIG. 1 is a schematic overview depicting DL and UL transmissions.
Figure 2A:
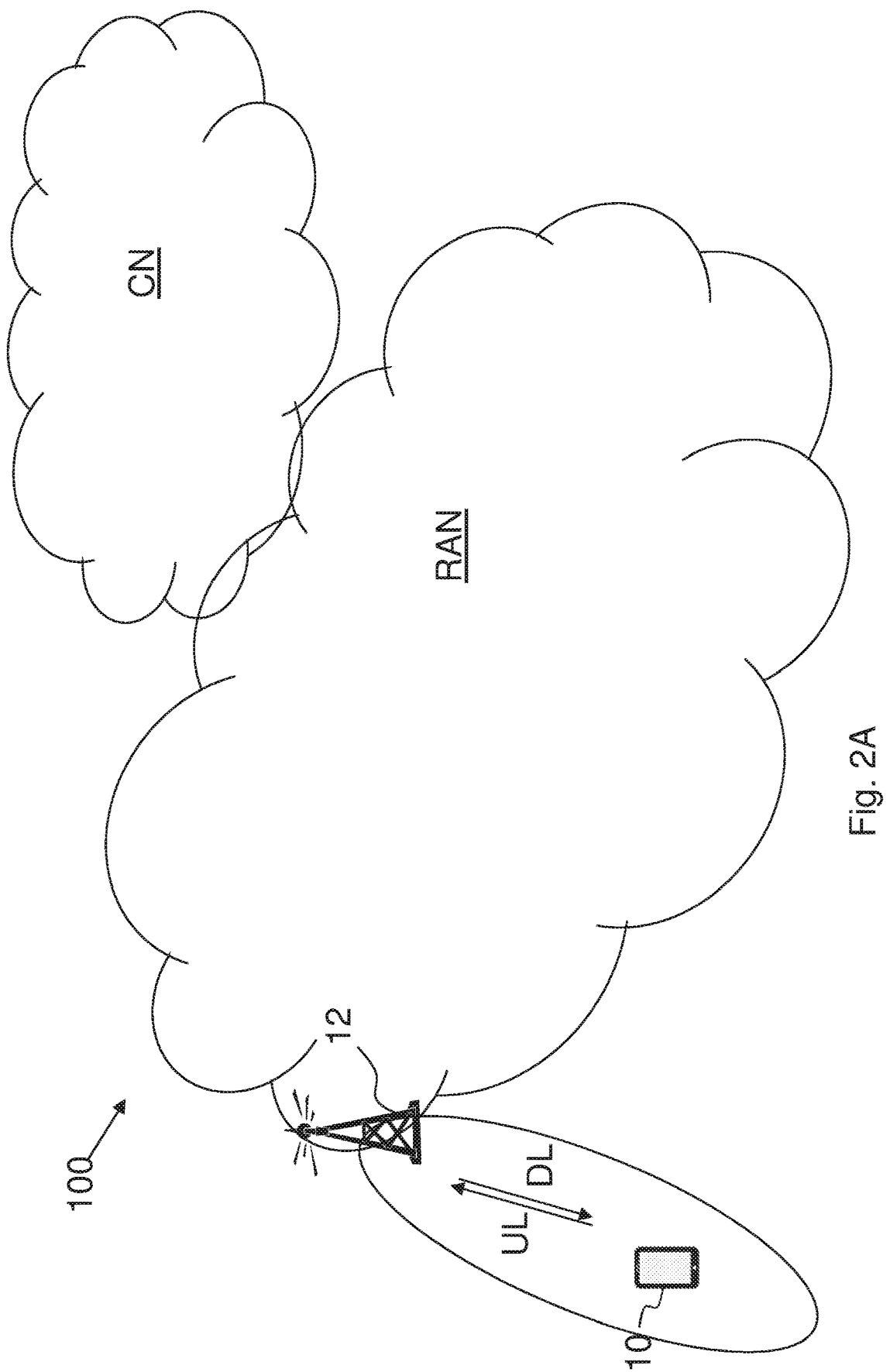
FIG. 2A is a schematic overview depicting a wireless communications network according to embodiments herein.

Embodiments herein relate to wireless communications networks in general. FIG. 2A is a schematic overview depicting a wireless communications network 100. The wireless communications network 100 comprises one or more RANs and one or more CNs. The wireless communications network 100 may use one or a number of different technologies. Embodiments herein relate to recent technology trends that are of particular interest in a New Radio (NR) context, however, embodiments are also applicable in further development of existing wireless communications systems such as e.g. LTE or Wideband Code Division Multiple Access (WCDMA).

In the wireless communications network 100, a user equipment (UE) 10 exemplified herein as a wireless device such as a mobile station, a non-access point (non-AP) station (STA), a STA and/or a wireless terminal, is comprised communicating via e.g. one or more Access Networks (AN), e.g. radio access network (RAN), to one or more core networks (CN). It should be understood by the skilled in the art that "UE" is a non-limiting term which means any terminal, wireless communications terminal, user equipment, narrowband internet of things (NB-IoT) device, Machine Type Communication (MTC) device, Device to Device (D2D) terminal, or node e.g. smart phone, laptop, mobile phone, sensor, relay, mobile tablets or even a small base station capable of communicating using radio communication with a radio network node within an area served by the radio network node.

The wireless communications network 100 comprises a radio network node 12 providing radio coverage over a geographical area, a first service area, of a first radio access technology (RAT), such as NR, LTE, or similar. The radio network node 12 may be a transmission and reception point such as an access node, an access controller, a base station, e.g. a radio base station such as a gNodeB (gNB), an evolved Node B (eNB, eNode B), a NodeB, a base transceiver station, a radio remote unit, an Access Point Base Station, a base station router, a Wireless Local Area Network (WLAN) access point or an Access Point Station (AP STA), a transmission arrangement of a radio base station, a stand-alone access point or any other network unit or node capable of communicating with a wireless device within the area served by the radio network node depending e.g. on the first radio access technology and terminology used. The radio network node may be referred to as a serving radio network node wherein the service area may be referred to as a serving cell, and the serving network node communicates with the wireless device in form of DL transmissions to the wireless device and UL transmissions from the wireless device. It should be noted that a service area may be denoted as cell, beam, beam group or similar to define an area of radio coverage.

The radio network node 12 may configure the UE 10 to perform methods disclosed herein for enabling access to a channel of the wireless communication network 100 for e.g. an unlicensed spectrum.

Figure 2B:
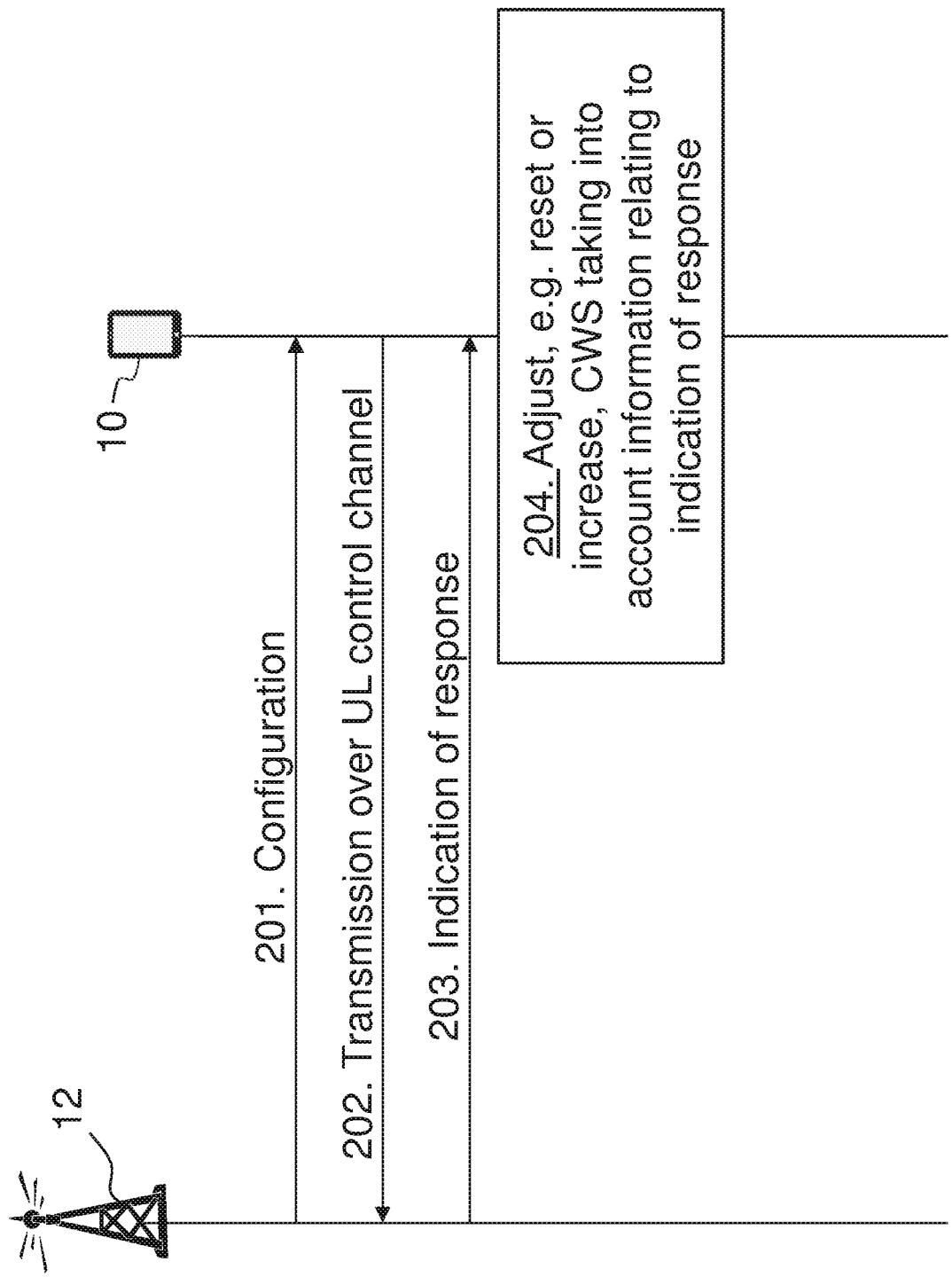
FIG. 2B is a combined signalling scheme and flowchart according to embodiments herein.

FIG. 2B is a combined flowchart and signalling scheme according to embodiments herein.

Action 201. The radio network node 12 send configuration data indicating that the UE 10 is to adjust, e.g. increase or reset, the value of the CW based on a determined response, from the radio network node 12, of an UL control channel transmission.

Action 202. The UE 10 may transmit an UL control transmission e.g. control data over an UL control channel.

Action 203. The radio network node 12 may inform the UE in an indication of a response. The response may be a received ACK, an UL grant, or a determined ACK e.g. not receiving scheduling for HARQ retransmission, receiving scheduling for HARQ transmission, receiving new transmissions or similar. The indication may be indicating outcome of a listen before talk operation on the UL control channel transmission.

Action 204. The UE 10 adjusts, e.g. increases or resets, a value of a CW based on the determined response, from the radio network node 12, of an UL control channel transmission.

Figure 3:
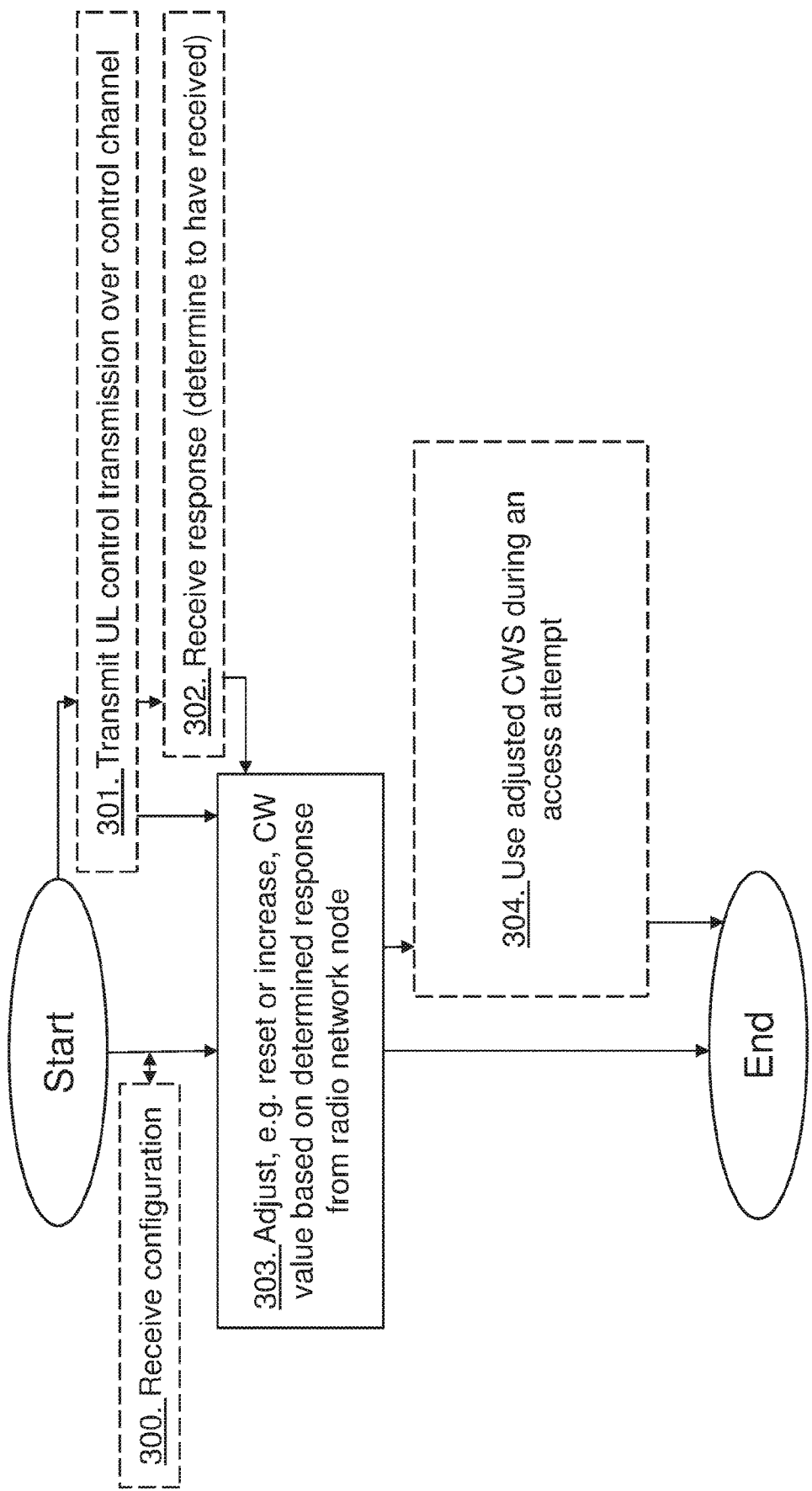
FIG. 3 is a schematic flowchart depicting a method performed by a UE according to embodiments herein.

A method, performed by the UE 10 is described herein for handling communication, e.g. gaining access, in the wireless communication network 100 in e.g. an unlicensed operation, see FIG. 3. The method may be understood to be for initiating a sensing procedure. The UE 10 operates in the wireless communications network 100. The method may comprise the following actions.

Action 300. The UE 10 may receive configuration data from the radio network node 12 defining the UE 10 to perform the contention window adjustment. The configuration may be triggered depending on measured load of UL control channel transmissions. CW adjustment may be enabled if measured load of UL control channel transmissions is above a threshold, and/or CW adjustment may be disabled if measured load of UL control channel transmissions is below another threshold or the threshold.

Action 301. The UE 10 may transmit an UL control transmission such as a PUCCH transmission e.g. a scheduling request (SR), HARQ ACK, HARQ NACK or similar over e.g. an unlicensed carrier.

Action 302. The UE 10 may in some cases receive or determine to have received a response from the radio network node 12 within a time interval from transmission of the UL control transmission. The time interval may be preconfigured or configured from the radio network node 12 during configuration. The response may be a received ACK, an UL grant, or a determined ACK e.g. not receiving scheduling for HARQ retransmission, receiving scheduling for HARQ transmission, receiving new transmissions or similar.

Action 303. The UE 10 adjusts, e.g. increases or resets, a value of a CW based on the determined response, from the radio network node 12, of an UL control channel transmission. E.g. taking into account information relating to response from radio network node. The determined response may be an indication of outcome of a listen before talk operation on the UL control channel transmission. E.g. the user equipment 10, with the proviso that the UE 10 receives, or determines to have received, at least one response message from the radio network node 12 after at least one UL control transmission by the UE 10 within a time period, may reset a CWS to a first value e.g. a minimum value, otherwise, i.e. the UE 10 does not receive, i.e. determines not to have received, at least one response message from the radio network node after at least one UL control transmission by the UE 10 within the configured time period, the CWS value may be increased to a next value. The next value may be higher than a current value for the CWS. The first value may be a minimum value or a same value as a current value for the CWS. The UE 10 may reset the CWS when a pre-set number of responses have been received during the time period. Thus, the UE 10 may adjust a value of a Contention Window (CW) based on one or more criteria. In some embodiments, the adjusting the value of the CW may comprise adjusting the value of the CW, from a second value to the first value, wherein the second value is a currently used value also referred to as current value. The first value may be a lower value, e.g., a first lower value, than the second value, and/o a higher value e.g. a first higher value. The UE 10 may adjust the CW value before a sensing procedure is performed prior to a transmission of an Uplink (UL) burst to the radio network node 12. The UE 10 may adjust the CW based on whether a response is received at the UE 10 within a time interval from a transmission of a UL control message to the radio network node 12. The UE 10 may change to a value smaller than current value or a same value in case the response has been received within the time period, otherwise, the value may be increased prolonging the CW. The UE 10 may thus perform a CWS adjustment based on the response from the radio network node 12.

For example, in case the UE 10 chooses e.g. Category 4 LBT for PUCCH transmissions, the LBT outcome and/or impact of the PUCCH transmissions is considered for adjustment of CWS. The CWS adjustment may be performed each time upon triggering of a PUCCH transmission, considering the response from the radio network node 12 after the recent PUCCH transmissions. The considered PUCCH transmissions may contain one or multiple PUCCH transmissions across different PUCCH configurations within a configured time period.

If a response such as an ACK is determined as the outcome of the LBT operation on the PUCCH transmissions, the UE 10 takes e.g. the below action:

for every priority class p∈{1, 2, 3, 4} set $CW_p = CW_{min,p}$ otherwise, increase $CW_p$ for every priority class (p∈{1, 2, 3, 4}) to the next higher allowed value.

There are several examples for the UE 10 on how to determine the outcome of the LBT operation on recent PUCCH transmissions.

As a first example, the UE 10 may have transmitted at least one PUCCH scheduling request (SR), as a response, the radio network node 12 may assign at least one UL grant to the UE 10. In this case the response may be determined as received and the CWS may be changed to a minimum value. Otherwise, NACK is determined and the CWS may be increased.

As a second example, the UE 10 has transmitted at least one PUCCH scheduling request (SR) via specific PUCCH resources for LCG x, as a response, the radio network node 12 may assign at least one UL grant to the UE and the corresponding PUSCH resources of the at least one UL grant fulfils the transmission requirements, e.g. Cell ID, PUSCH duration, subcarrier spacing (SCS), of the LCHs within LCG x. In this case ACK can be determined. Otherwise, NACK is determined.

As a third example, the UE 10 may have transmitted at least one PUCCH carrying a HARQ ACK, as a response, the radio network node 12 has not scheduled HARQ retransmissions for the corresponding HARQ process after the PUCCH transmission within a certain preconfigured/predetermined period which may be aligned with the period configured for PUCCH transmission monitoring. In this case, ACK can be determined. Otherwise, NACK can be determined.

As another example, the UE 10 has transmitted at least one PUCCH carrying a HARQ NACK, as a response, the radio network node 12 has scheduled HARQ retransmission for the corresponding HARQ process within a preconfigured/predetermined period which may be aligned with the period configured for PUCCH transmission monitoring. In this case, ACK is determined.

As a fourth example, the UE 10 may have transmitted at least one PUCCH carrying a HARQ NACK, as a response, the radio network node 12 has not scheduled HARQ retransmission for the corresponding HARQ process within a preconfigured/predetermined period which may be aligned with the period configured for PUCCH transmission monitoring, NACK can be determined.

As a fifth example, the UE 10 may have transmitted at least one PUCCH carrying a channel state information (CSI), as a response, the radio network node 12 may have started further action based on received CSI, e.g., new transmissions, change of the serving beam, rank, etc. In this case, ACK can be determined, otherwise, NACK can be determined.

As an example, the UE 10 physical layer has indicated at least one PUCCH transmission among those recent transmissions has been transmitted successfully after the success for the LBT operation. Therefore, ACK can be determined.

As an additional example, the UE 10 physical layer has indicated at least one DL transmission to the UE 10 has been successfully received after the success for the LBT operation. Therefore, ACK can be determined.

Action 304. The UE 10 may then use the adjusted CWS during a sensing procedure for accessing a channel, e.g. during an access attempt.

In some embodiments all the actions may be performed. In some embodiments, one or more actions may be performed. One or more embodiments may be combined, where applicable. All possible combinations are not described to simplify the description. In FIG. 3, optional actions are indicated with dashed lines. Some actions may be performed in a different order than that shown in FIG. 3.

The embodiments are described in the context of NR unlicensed spectrum (NR-U). The solutions are not limited to NR-U scenarios. They are also applicable to other unlicensed operation scenarios such as LTE LAA/eLAA/feLAA.

For any above example, the UE 10 may be configured to perform CWS adjustment only when a number of ACKs have been determined during a configured time period.

For any above example, the PUCCH slots or resources that have triggered PUCCH transmissions within a monitoring period for CWS adjustment are the reference PUCCH slots/resources.

The response provided/indicated by the radio network node 12 may need to be coupled/connected to one of the PUCCH reference slot/transmission within the period. For example, the resource assignments or new transmission/retransmission which are indicated via the response message must be able to connect to at least one of the PUCCH reference slots/resources within the monitoring period. The connection may be determined if both the reference slot/resource and the response are connected to the same service or channel access priority class (CAPC), or same SR/PUCCH configuration, or the same HARQ processes.

Same as in LTE LAA, the UE 10 may further perform below actions.

If $CW_p = CW_{max,p}$, the next higher allowed value for adjusting $CW_p$ is $CW_{max,p}$.

If the $CW_p = CW_{max,p}$ is consecutively used K times for generation of $N_{init}$, $CW_p$ is reset to $CW_{min,p}$ only for that priority class P for which $CW_p = CW_{max,p}$ is consecutively used K times for generation of $N_{init}$. K is selected by UE from the set of values {1, 2, . . . , 8} for each priority class p∈{1, 2, 3, 4}.

Figure 4:
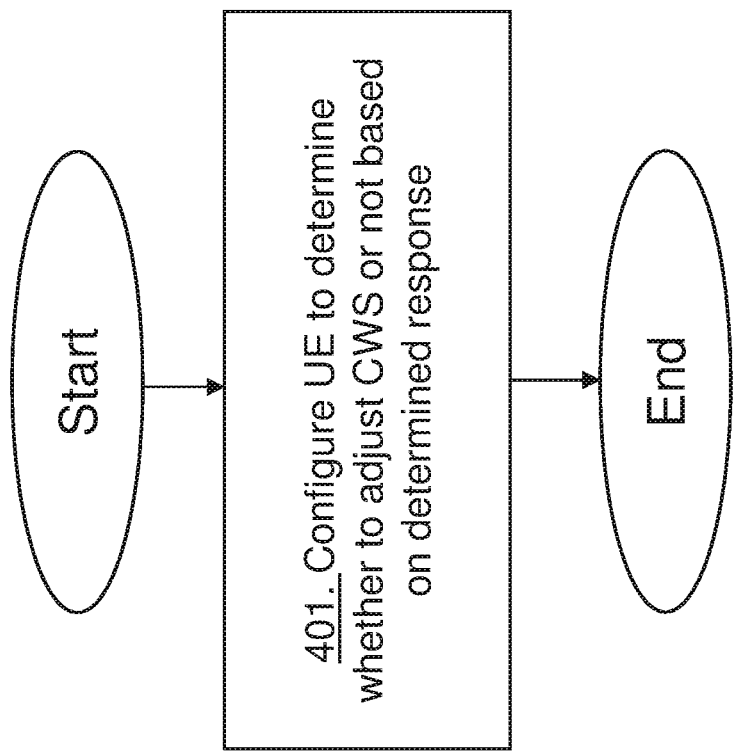
FIG. 4 is a schematic flowchart depicting a method performed by a radio network node according to embodiments herein.

The method actions performed by the radio network node 12 for handling communication e.g. configuring UEs for gaining access, in the wireless communication network according to some embodiments will now be described with reference to a flowchart depicted in FIG. 4.

Action 401. The radio network node 12 configures, e.g. transmitting configuration to, the UE 10 to adjust, e.g. increase or reset, the value of the CW based on a determined response, from the radio network node 12, of an UL control channel transmission. The configuration may be per UE, cell, carrier, bandwidth part, channel, and/or subband. The configuring may be triggered depending on measured load of UL control channel transmissions. E.g. adjusting of the CW is enabled if measured load of UL control channel transmissions is above a threshold, and/or the adjusting of the CW is disabled if measured load of UL control channel transmissions is below another threshold or the threshold. The determined response may be an indication of outcome of a listen before talk operation on the UL control channel transmission, e.g. over an unlicensed carrier.

Hence, as a second embodiment, the function of CWS adjustment based on PUCCH transmissions may be configured per UE basis. In other words, some UEs may be allowed to adjust the CWS based on PUCCH transmissions while some other UEs may be not allowed to adjust the CWS based on PUCCH transmissions.

As a third embodiment, the function of CWS adjustment based on PUCCH transmissions may be configured per cell/BWP/channel/subband via broadcast information.

As a fourth embodiment, the function of CWS adjustment based on PUCCH transmissions may be configured per channel access priority class (CAPC)/service/logical channel (LCH)/logical channel group (LCG). For example, the CWS adjustment is performed per service, therefore, the monitored PUCCH transmissions are also per service. The CWS adjustment for one service will not affect the CWS values associated with other services.

As a fifth embodiment, the function of CWS adjustment based on PUCCH transmissions may be enabled or disabled according to the PUCCH load (per UE/cell/BWP/channel/subband). In one example, the function of CWS adjustment based on PUCCH transmissions is enabled if the monitored PUCCH load is above a given threshold. It may be an absolute threshold defined as e.g., number of PUCCH transmissions within a given time period, or the data volume of PUCCH transmissions, or received PUCCH SINR at the radio network node 12 etc. It may be also a relative threshold comparable to the total load, such as X % of PUCCH load is detected. In another example, the function of CWS adjustment based on PUCCH transmissions is disabled if the monitored PUCCH load is below another given threshold. The enabling or disabling of the function is signaled by the radio network node 12 via e.g. an RRC signaling (dedicated RRC signaling and/or system information), a MAC CE or a downlink control information (DCI) signaling.

The examples are described in the context of NR unlicensed spectrum (NR-U). The solutions are not limited to NR-U scenarios. They are also applicable to other unlicensed operation scenarios such as LTE LAA/eLAA/feLAA or WiFi.

Figure 5:
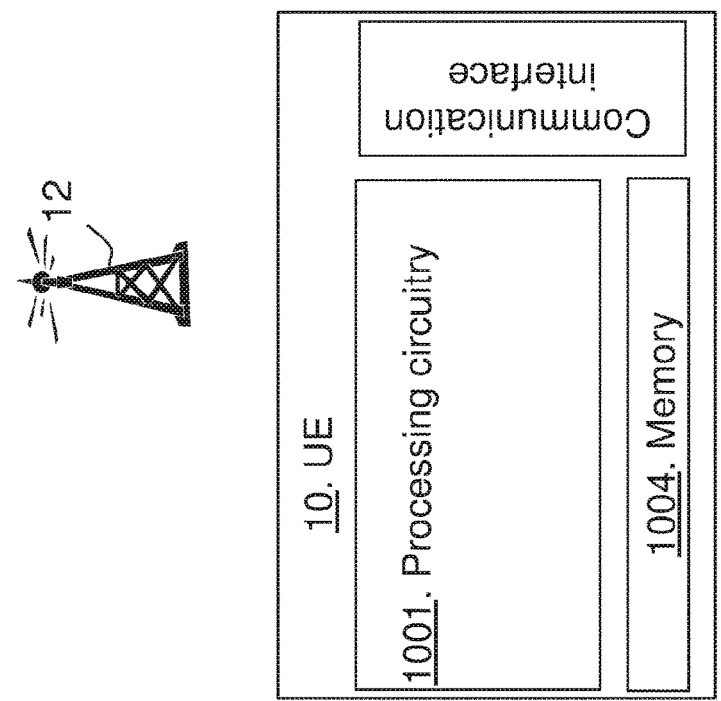
FIG. 5 is a block diagram depicting a UE according to embodiments herein.
Figure 5:
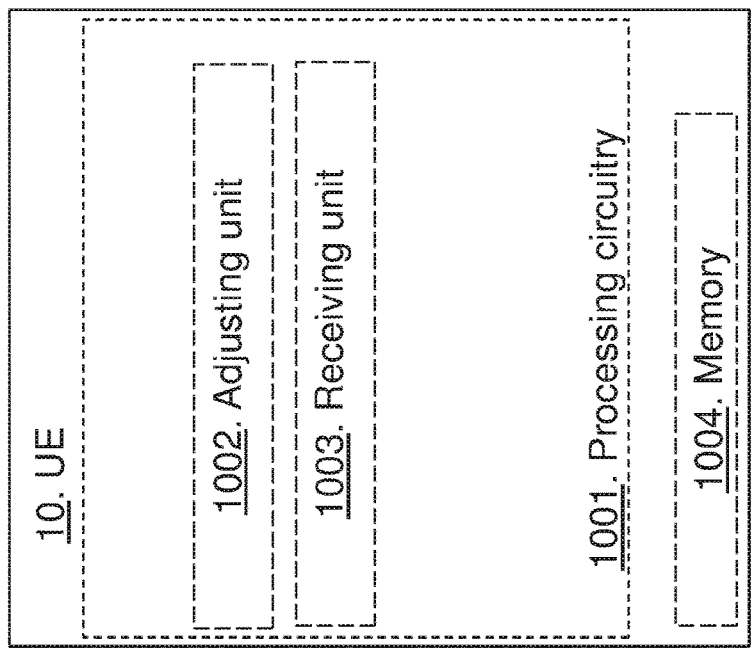
Figure 5:
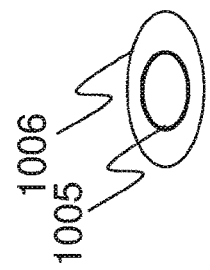

FIG. 5 is a block diagram depicting the UE for handling communication in the wireless communication network 100 according to embodiments herein.

The UE 10 may comprise processing circuitry 1001, e.g. one or more processors, configured to perform the methods herein.

The UE 10 may comprise an adjusting unit 1002. The UE 10, the processing circuitry 1001, and/or the adjusting unit 1002 is configured to adjust the value of the CW based on the determined response, from the radio network node 12, of the UL control channel transmission. The determined response may be an indication of outcome of a listen before talk operation on the UL control channel transmission. The UE 10, the processing circuitry 1001, and/or the adjusting unit 1002 may be configured to adjust the value, with the proviso that the UE 10 receives or has determined to receive, at least one response message from the radio network node 12 after at least one UL control transmission by the UE within a time period, resetting the contention window size, CWS, to a first value, otherwise, the CWS is increased to the next value. The next value may be higher than a current value for the CWS. The first value may be a minimum value or a same value as a current value for the CWS. The UE 10, the processing circuitry 1001, and/or the adjusting unit 1002 may be configured to reset the CWS when a pre-set number of responses have been received during the time period.

The UE 10 may comprise a receiving unit 1003. The UE 10, the processing circuitry 1001, and/or the receiving unit 1003 may be configured to receive configuration data from the radio network node 12 defining the UE 10 to perform the contention window adjustment. The configuration may be triggered depending on measured load of UL control channel transmissions. The CW adjustment may be enabled if measured load of UL control channel transmissions is above a threshold. The CW adjustment may be disabled if measured load of UL control channel transmissions is below the threshold or another threshold.

The UE 10 further comprises a memory 1004. The memory 1004 comprises one or more units to be used to store data on, such as data packets, events and applications to perform the methods disclosed herein when being executed, and similar. Furthermore, the UE 10 may comprise a communication interface such as comprising a transmitter, a receiver and/or a transceiver.

The methods according to the embodiments described herein for the UE 10 are respectively implemented by means of e.g. a computer program product 1005 or a computer program, comprising instructions, i.e., software code portions, which, when executed on at least one processor, cause the at least one processor to carry out the actions described herein, as performed by the UE 10. The computer program product 1005 may be stored on a computer-readable storage medium 1006, e.g. a disc, a universal serial bus (USB) stick or similar. The computer-readable storage medium 1006, having stored thereon the computer program product, may comprise the instructions which, when executed on at least one processor, cause the at least one processor to carry out the actions described herein, as performed by the UE 10. In some embodiments, the computer-readable storage medium may be a transitory or a non-transitory computer-readable storage medium. Thus, embodiments herein may disclose a UE for handling communication in a wireless communications network, wherein the UE comprises processing circuitry and a memory, said memory comprising instructions executable by said processing circuitry whereby said UE is operative to perform any of the methods herein.

Figure 6:
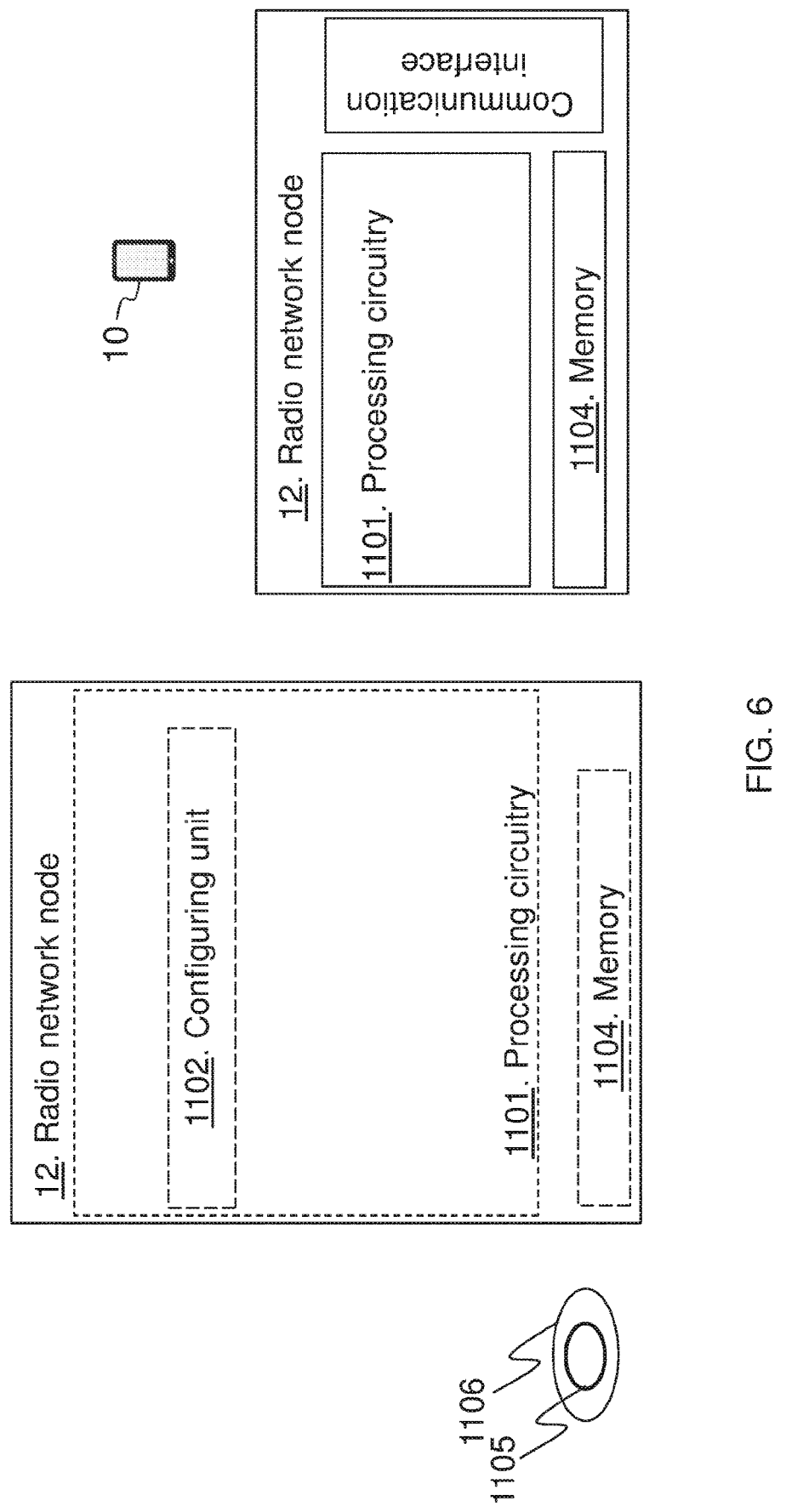
FIG. 6 is a block diagram depicting a radio network node according to embodiments herein.

FIG. 6 is a block diagram depicting the radio network node 12 for handling data packets or handling communication in the wireless communications network 100 according to embodiments herein.

The radio network node 12 may comprise processing circuitry 1101, e.g. one or more processors, configured to perform the methods herein.

The radio network node 12 may comprise a configuring unit 1102. The radio network node 12, the processing circuitry 1101, and/or the configuring unit 1102 is configured to configure the UE 10 to adjust the value of the CW based on the determined response, from the radio network node 12, of the UL control channel transmission. The configuring may be per UE, cell, carrier, bandwidth part, channel, and/or subband. The radio network node 12, the processing circuitry 1101, and/or the configuring unit 1102 is configured to trigger to configuring of the UE depending on measured load of uplink, UL, control channel transmissions. E.g. the adjusting of the CW may be enabled if measured load of UL control channel transmissions is above a threshold, and/or the adjusting of the CW may be disabled if measured load of uplink, UL, control channel transmissions is below the threshold or another threshold. The determined response may be an indication of outcome of a listen before talk operation on the UL control channel transmission.

The radio network node 12 further comprises a memory 1104. The memory 1104 comprises one or more units to be used to store data on, such as data packets, events and applications to perform the methods disclosed herein when being executed, and similar. Furthermore, the radio network node 12 may comprise a communication interface such as comprising a transmitter, a receiver and/or a transceiver.

The methods according to the embodiments described herein for the radio network node 12 are respectively implemented by means of e.g. a computer program product 1105 or a computer program, comprising instructions, i.e., software code portions, which, when executed on at least one processor, cause the at least one processor to carry out the actions described herein, as performed by the radio network node 12. The computer program product 1105 may be stored on a computer-readable storage medium 1106, e.g. a disc, a universal serial bus (USB) stick or similar. The computer-readable storage medium 1106, having stored thereon the computer program product, may comprise the instructions which, when executed on at least one processor, cause the at least one processor to carry out the actions described herein, as performed by the radio network node 12. In some embodiments, the computer-readable storage medium may be a transitory or a non-transitory computer-readable storage medium. Thus, embodiments herein may disclose a radio network node for handling communication in a wireless communications network, wherein the radio network node comprises processing circuitry and a memory, said memory comprising instructions executable by said processing circuitry whereby said radio network node is operative to perform any of the methods herein.

In some embodiments a more general term "radio network node" is used and it can correspond to any type of radio-network node or any network node, which communicates with a wireless device and/or with another network node. Examples of network nodes are NodeB, MeNB, SeNB, a network node belonging to Master cell group (MCG) or Secondary cell group (SCG), base station (BS), multi-standard radio (MSR) radio node such as MSR BS, eNodeB, network controller, radio-network controller (RNC), base station controller (BSC), relay, donor node controlling relay, base transceiver station (BTS), access point (AP), transmission points, transmission nodes, Remote radio Unit (RRU), Remote Radio Head (RRH), nodes in distributed antenna system (DAS), etc.

In some embodiments the non-limiting term wireless device or user equipment (UE) is used and it refers to any type of wireless device communicating with a network node and/or with another wireless device in a cellular or mobile communication system. Examples of UE are target device, device to device (D2D) UE, proximity capable UE (aka ProSe UE), machine type UE or UE capable of machine to machine (M2M) communication, Tablet, mobile terminals, smart phone, laptop embedded equipped (LEE), laptop mounted equipment (LME), USB dongles etc.

Embodiments are applicable to any RAT or multi-RAT systems, where the wireless device receives and/or transmit signals (e.g. data) e.g. New Radio (NR), Wi-Fi, Long Term Evolution (LTE), LTE-Advanced, Wideband Code Division Multiple Access (WCDMA), Global System for Mobile communications/enhanced Data rate for GSM Evolution (GSM/EDGE), Worldwide Interoperability for Microwave Access (WiMax), or Ultra Mobile Broadband (UMB), just to mention a few possible implementations.

As will be readily understood by those familiar with communications design, that functions means or circuits may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a wireless device or network node, for example.

Alternatively, several of the functional elements of the processing means discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware and/or program or application data. Other hardware, conventional and/or custom, may also be included. Designers of communications devices will appreciate the cost, performance, and maintenance trade-offs inherent in these design choices.

Figure 7:
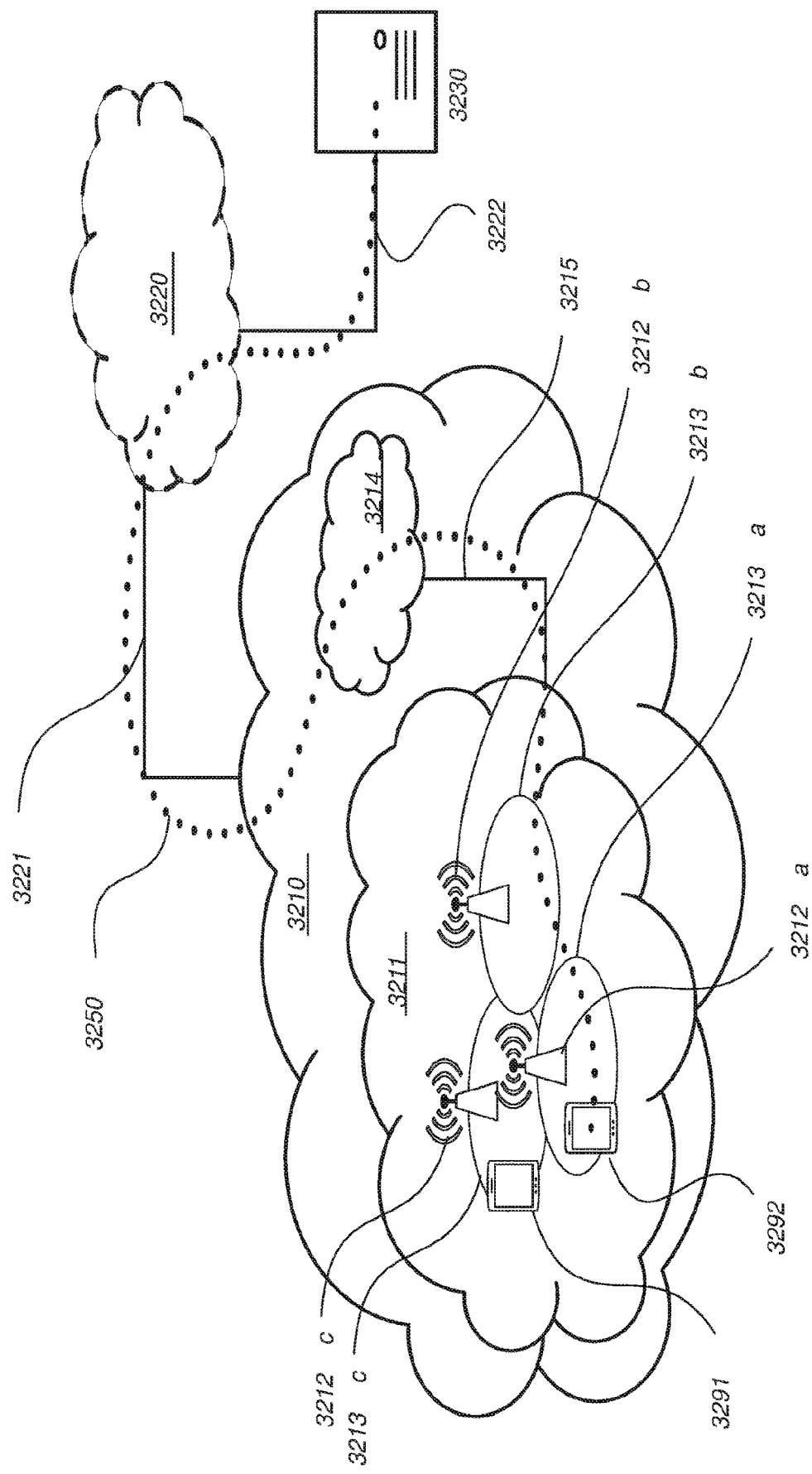
FIG. 7 is a telecommunication network connected via an intermediate network to a host computer in accordance with some embodiments.

FIG. 7 shows a Telecommunication network connected via an intermediate network to a host computer in accordance with some embodiments. With reference to FIG. 7, in accordance with an embodiment, a communication system includes telecommunication network 3210, such as a 3GPP-type cellular network, which comprises access network 3211, such as a radio access network, and core network 3214. Access network 3211 comprises a plurality of base stations 3212*a*, 3212*b*, 3212*c*, such as NBs, eNBs, gNBs or other types of wireless access points being examples of the radio network node 12 above, each defining a corresponding coverage area 3213*a*, 3213*b*, 3213*c*. Each base station 3212*a*, 3212*b*, 3212*c* is connectable to core network 3214 over a wired or wireless connection 3215. A first UE 3291 located in coverage area 3213*c* is configured to wirelessly connect to, or be paged by, the corresponding base station 3212*c*. A second UE 3292 in coverage area 3213*a* is wirelessly connectable to the corresponding base station 3212*a*. While a plurality of UEs 3291, 3292 are illustrated in this example being examples of the wireless device 10 above, the disclosed embodiments are equally applicable to a situation where a sole UE is in the coverage area or where a sole UE is connecting to the corresponding base station 3212.

Telecommunication network 3210 is itself connected to host computer 3230, which may be embodied in the hardware and/or software of a standalone server, a cloud-implemented server, a distributed server or as processing resources in a server farm. Host computer 3230 may be under the ownership or control of a service provider, or may be operated by the service provider or on behalf of the service provider. Connections 3221 and 3222 between telecommunication network 3210 and host computer 3230 may extend directly from core network 3214 to host computer 3230 or may go via an optional intermediate network 3220. Intermediate network 3220 may be one of, or a combination of more than one of, a public, private or hosted network; intermediate network 3220, if any, may be a backbone network or the Internet; in particular, intermediate network 3220 may comprise two or more sub-networks (not shown).

The communication system of FIG. 7 as a whole enables connectivity between the connected UEs 3291, 3292 and host computer 3230. The connectivity may be described as an over-the-top (OTT) connection 3250. Host computer 3230 and the connected UEs 3291, 3292 are configured to communicate data and/or signaling via OTT connection 3250, using access network 3211, core network 3214, any intermediate network 3220 and possible further infrastructure (not shown) as intermediaries. OTT connection 3250 may be transparent in the sense that the participating communication devices through which OTT connection 3250 passes are unaware of routing of uplink and downlink communications. For example, base station 3212 may not or need not be informed about the past routing of an incoming downlink communication with data originating from host computer 3230 to be forwarded (e.g., handed over) to a connected UE 3291. Similarly, base station 3212 need not be aware of the future routing of an outgoing uplink communication originating from the UE 3291 towards the host computer 3230.

Figure 8:
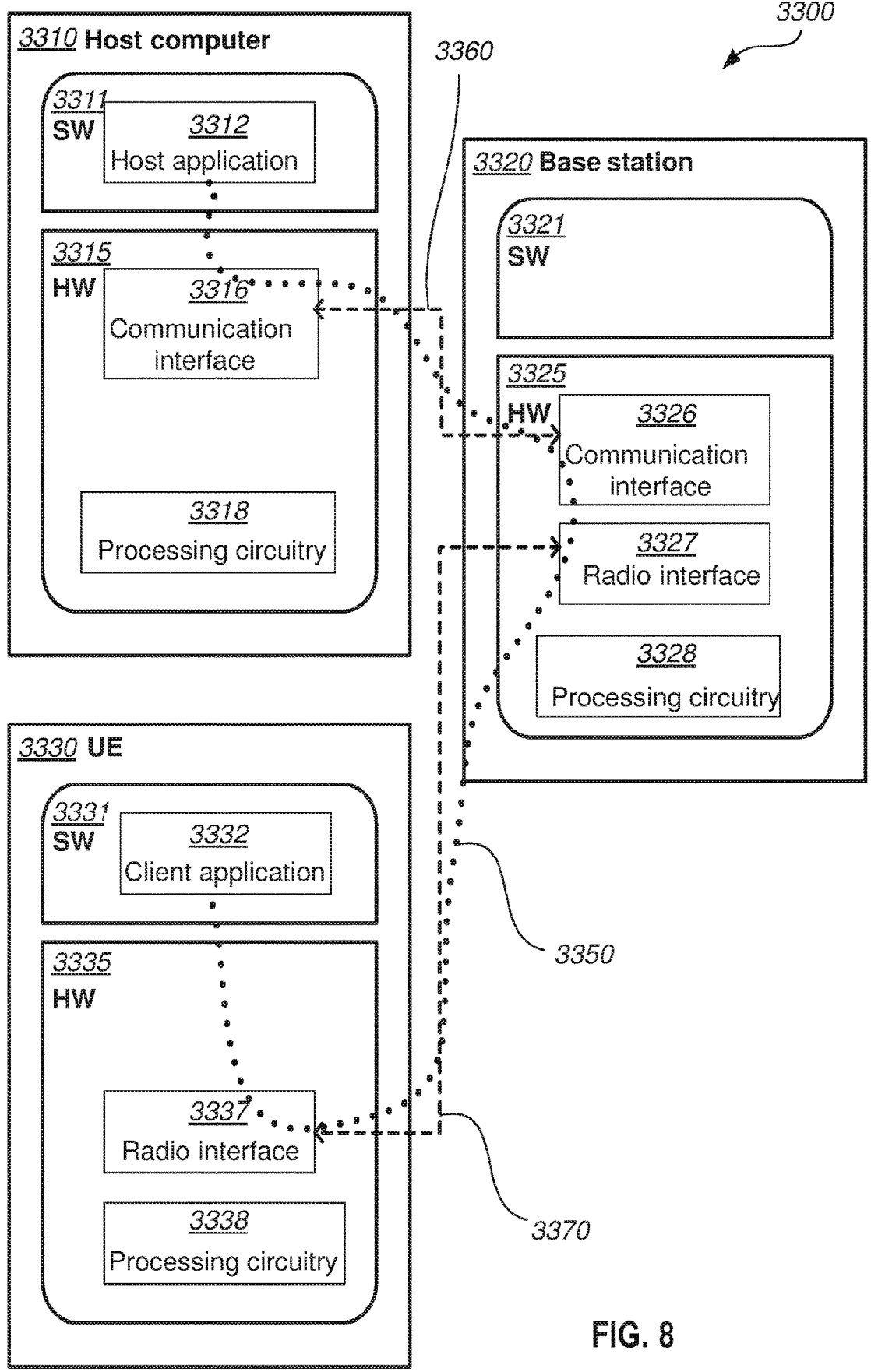
FIG. 8 is a host computer communicating via a base station with a user equipment over a partially wireless connection in accordance with some embodiments.

FIG. 8 shows a host computer communicating via a base station and with a user equipment over a partially wireless connection in accordance with some embodiments Example implementations, in accordance with an embodiment, of the UE, base station and host computer discussed in the preceding paragraphs will now be described with reference to FIG. 8. In communication system 3300, host computer 3310 comprises hardware 3315 including communication interface 3316 configured to set up and maintain a wired or wireless connection with an interface of a different communication device of communication system 3300. Host computer 3310 further comprises processing circuitry 3318, which may have storage and/or processing capabilities. In particular, processing circuitry 3318 may comprise one or more programmable processors, application-specific integrated circuits, field programmable gate arrays or combinations of these (not shown) adapted to execute instructions. Host computer 3310 further comprises software 3311, which is stored in or accessible by host computer 3310 and executable by processing circuitry 3318. Software 3311 includes host application 3312. Host application 3312 may be operable to provide a service to a remote user, such as UE 3330 connecting via OTT connection 3350 terminating at UE 3330 and host computer 3310. In providing the service to the remote user, host application 3312 may provide user data which is transmitted using OTT connection 3350.

Communication system 3300 further includes base station 3320 provided in a telecommunication system and comprising hardware 3325 enabling it to communicate with host computer 3310 and with UE 3330. Hardware 3325 may include communication interface 3326 for setting up and maintaining a wired or wireless connection with an interface of a different communication device of communication system 3300, as well as radio interface 3327 for setting up and maintaining at least wireless connection 3370 with UE 3330 located in a coverage area (not shown in FIG. 8) served by base station 3320. Communication interface 3326 may be configured to facilitate connection 3360 to host computer 3310. Connection 3360 may be direct or it may pass through a core network (not shown in FIG. 8) of the telecommunication system and/or through one or more intermediate networks outside the telecommunication system. In the embodiment shown, hardware 3325 of base station 3320 further includes processing circuitry 3328, which may comprise one or more programmable processors, application-specific integrated circuits, field programmable gate arrays or combinations of these (not shown) adapted to execute instructions. Base station 3320 further has software 3321 stored internally or accessible via an external connection.

Communication system 3300 further includes UE 3330 already referred to. It's hardware 3333 may include radio interface 3337 configured to set up and maintain wireless connection 3370 with a base station serving a coverage area in which UE 3330 is currently located. Hardware 3333 of UE 3330 further includes processing circuitry 3338, which may comprise one or more programmable processors, application-specific integrated circuits, field programmable gate arrays or combinations of these (not shown) adapted to execute instructions. UE 3330 further comprises software 3331, which is stored in or accessible by UE 3330 and executable by processing circuitry 3338. Software 3331 includes client application 3332. Client application 3332 may be operable to provide a service to a human or non-human user via UE 3330, with the support of host computer 3310. In host computer 3310, an executing host application 3312 may communicate with the executing client application 3332 via OTT connection 3350 terminating at UE 3330 and host computer 3310. In providing the service to the user, client application 3332 may receive request data from host application 3312 and provide user data in response to the request data. OTT connection 3350 may transfer both the request data and the user data. Client application 3332 may interact with the user to generate the user data that it provides.

It is noted that host computer 3310, base station 3320 and UE 3330 illustrated in FIG. 8 may be similar or identical to host computer 3230, one of base stations 3212a, 3212b, 3212c and one of UEs 3291, 3292 of FIG. 7, respectively. This is to say, the inner workings of these entities may be as shown in FIG. 8 and independently, the surrounding network topology may be that of FIG. 7.

In FIG. 8, OTT connection 3350 has been drawn abstractly to illustrate the communication between host computer 3310 and UE 3330 via base station 3320, without explicit reference to any intermediary devices and the precise routing of messages via these devices. Network infrastructure may determine the routing, which it may be configured to hide from UE 3330 or from the service provider operating host computer 3310, or both. While OTT connection 3350 is active, the network infrastructure may further take decisions by which it dynamically changes the routing (e.g., on the basis of load balancing consideration or reconfiguration of the network).

Wireless connection 3370 between UE 3330 and base station 3320 is in accordance with the teachings of the embodiments described throughout this disclosure. One or more of the various embodiments improve the performance of OTT services provided to UE 3330 using OTT connection 3350, in which wireless connection 3370 forms the last segment. More precisely, the teachings of these embodiments make it possible to enhance the CWS maintenance scheme for PUCCH transmission and/or a better fairness of channel accesses may be achieved. Embodiments herein may e.g. enable the radio network node to more efficiently control the performance of the UEs by configuring the UEs according to embodiments herein, and to more efficiently utilize the spectrum available thus resulting in a better responsiveness.

A measurement procedure may be provided for the purpose of monitoring data rate, latency and other factors on which the one or more embodiments improve. There may further be an optional network functionality for reconfiguring OTT connection 3350 between host computer 3310 and UE 3330, in response to variations in the measurement results. The measurement procedure and/or the network functionality for reconfiguring OTT connection 3350 may be implemented in software 3311 and hardware 3315 of host computer 3310 or in software 3331 and hardware 3333 of UE 3330, or both. In embodiments, sensors (not shown) may be deployed in or in association with communication devices through which OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of OTT connection 3350 may include message format, retransmission settings, preferred routing etc.; the reconfiguring need not affect base station 3320, and it may be unknown or imperceptible to base station 3320. Such procedures and functionalities may be known and practiced in the art. In certain embodiments, measurements may involve proprietary UE signaling facilitating host computer 3310's measurements of throughput, propagation times, latency and the like. The measurements may be implemented in that software 3311 and 3331 causes messages to be transmitted, in particular empty or 'dummy' messages, using OTT connection 3350 while it monitors propagation times, errors etc.

Figures 9, 10:
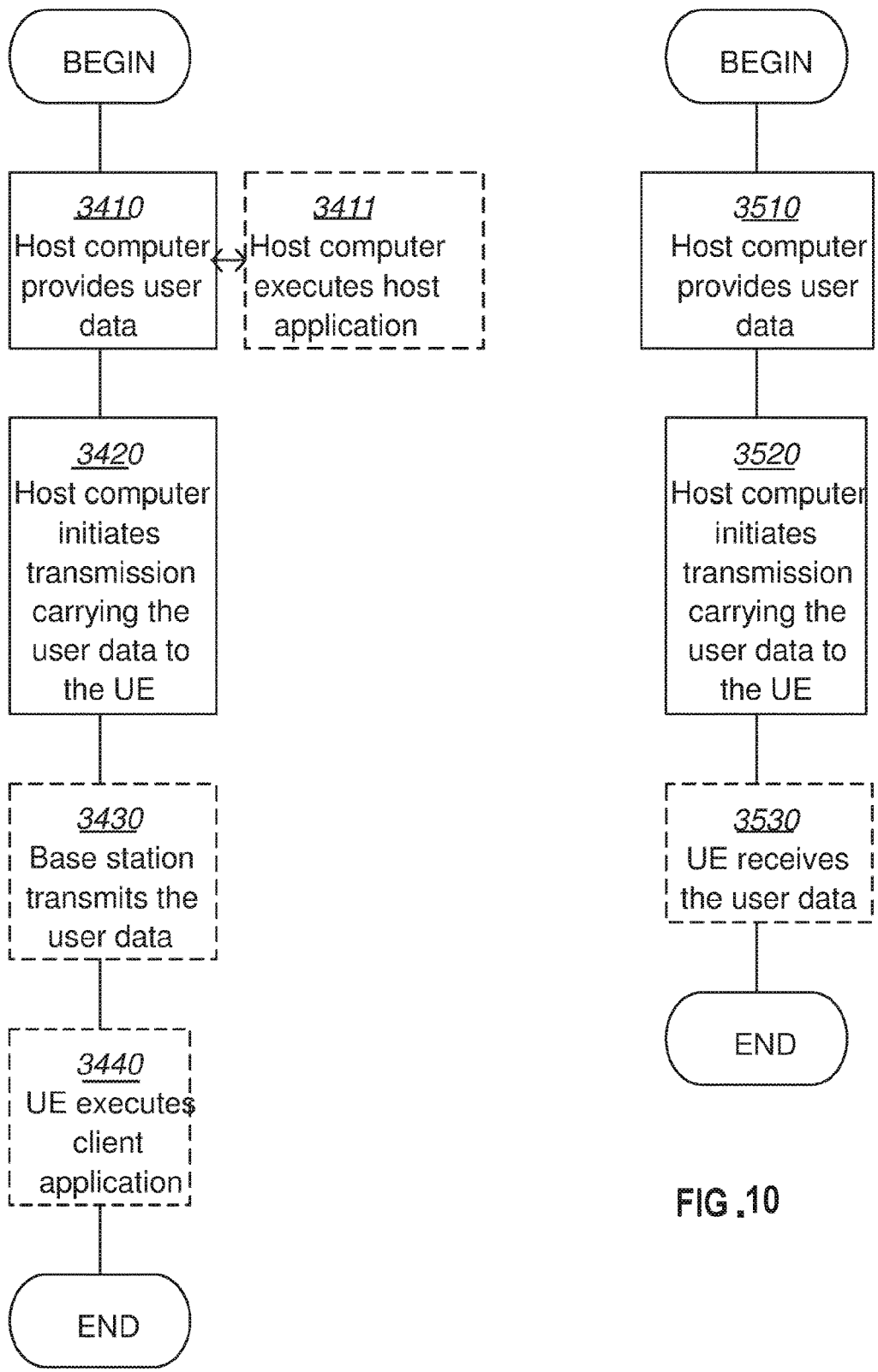
FIG. 9 shows methods implemented in a communication system including a host computer, a base station and a user equipment in accordance with some embodiments.
FIG. 10 shows methods implemented in a communication system including a host computer, a base station and a user equipment in accordance with some embodiments.

FIG. 9 shows methods implemented in a communication system including a host computer, a base station and a user equipment in accordance with some embodiments.

FIG. 9 is a flowchart illustrating a method implemented in a communication system, in accordance with one embodiment. The communication system includes a host computer, a base station and a UE which may be those described with reference to FIG. 7 and FIG. 8. For simplicity of the present disclosure, only drawing references to FIG. 9 will be included in this section. In step 3410, the host computer provides user data. In substep 3411 (which may be optional) of step 3410, the host computer provides the user data by executing a host application. In step 3420, the host computer initiates a transmission carrying the user data to the UE. In step 3430 (which may be optional), the base station transmits to the UE the user data which was carried in the transmission that the host computer initiated, in accordance with the teachings of the embodiments described throughout this disclosure. In step 3440 (which may also be optional), the UE executes a client application associated with the host application executed by the host computer.

FIG. 10 shows methods implemented in a communication system including a host computer, a base station and a user equipment in accordance with some embodiments.

FIG. 10 is a flowchart illustrating a method implemented in a communication system, in accordance with one embodiment. The communication system includes a host computer, a base station and a UE which may be those described with reference to FIG. 7 and FIG. 8. For simplicity of the present disclosure, only drawing references to FIG. 10 will be included in this section. In step 3510 of the method, the host computer provides user data. In an optional substep (not shown) the host computer provides the user data by executing a host application. In step 3520, the host computer initiates a transmission carrying the user data to the UE. The transmission may pass via the base station, in accordance with the teachings of the embodiments described throughout this disclosure. In step 3530 (which may be optional), the UE receives the user data carried in the transmission.

FIG. 11 shows methods implemented in a communication system including a host computer, a base station and a user equipment in accordance with some embodiments.

FIG. 11 is a flowchart illustrating a method implemented in a communication system, in accordance with one embodiment. The communication system includes a host computer, a base station and a UE which may be those described with reference to FIG. 7 and FIG. 8. For simplicity of the present disclosure, only drawing references to FIG. 11 will be included in this section. In step 3610 (which may be optional), the UE receives input data provided by the host computer. Additionally or alternatively, in step 3620, the UE provides user data. In substep 3621 (which may be optional) of step 3620, the UE provides the user data by executing a client application. In substep 3611 (which may be optional) of step 3610, the UE executes a client application which provides the user data in reaction to the received input data provided by the host computer. In providing the user data, the executed client application may further consider user input received from the user. Regardless of the specific manner in which the user data was provided, the UE initiates, in substep 3630 (which may be optional), transmission of the user data to the host computer. In step 3640 of the method, the host computer receives the user data transmitted from the UE, in accordance with the teachings of the embodiments described throughout this disclosure.

FIG. 12 show methods implemented in a communication system including a host computer, a base station and a user equipment in accordance with some embodiments.

FIG. 12 is a flowchart illustrating a method implemented in a communication system, in accordance with one embodiment. The communication system includes a host computer, a base station and a UE which may be those described with reference to FIG. 7 and FIG. 8. For simplicity of the present disclosure, only drawing references to FIG. 12 will be included in this section. In step 3710 (which may be optional), in accordance with the teachings of the embodiments described throughout this disclosure, the base station receives user data from the UE. In step 3720 (which may be optional), the base station initiates transmission of the received user data to the host computer. In step 3730 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

It will be appreciated that the foregoing description and the accompanying drawings represent non-limiting examples of the methods and apparatus taught herein. As such, the apparatus and techniques taught herein are not limited by the foregoing description and accompanying drawings. Instead, the embodiments herein are limited only by the following claims and their legal equivalents.

Abbreviation Explanation

ACK (positive) Acknowledgment
AUL Autonomous uplink
BLER Block error rate
BWP Bandwidth Part CAPC Channel access priority class
CBG Code block group
CCA Clear channel assessment
CO Channel occupancy
COT Channel occupancy time
CWS Contention window size
DL Downlink
ED Energy detection
eNB 4G base station
gNB 5G base station
HARQ Hybrid automatic repeat request
IS In synch
LAA Licensed assisted access
LBT Listen before talk
MAC Medium access control
MCOT Maximum channel occupancy time
NACK Negative acknowledgment
NDI New data indicator
NR 3GPP defined 5G radio access technology
NR-U NR unlicensed
OOS out of synch
PCell Primary cell
PCI Physical cell identity
PDCCH A downlink control channel
PDU Protocol data unit
PHICH Physical channel Hybrid ARQ Indicator Channel
PLMN Public land mobile network
PSCell Primary SCG cell
PUCCH Physical Uplink Control Channel
PUSCH Physical Uplink Shared Channel
QCI QoS class identifier
QoS Quality of service
RAT Radio access technology
RLF Radio link failure
RLM Radio link monitoring
RLC Radio link control
RRC Radio resource control
RS Reference signal
SCG Secondary cell group
SDU Service data unit
SMTC SSB-based measurement timing configuration
SpCell Special cell (PCell or PSCell)
SPS Semi persistent scheduling
TTI Transmission time interval
UCI Uplink Control Information
UE User equipment
UL Uplink

REFERENCES

[1] 3GPP TR 38.889 "Study on NR-based access to unlicensed spectrum, Release 16", v 16.0.0
[2] 3GPP TS 36.213 "Evolved Universal Terrestrial Radio Access (E-UTRA); Physical layer procedures", v 15.1.0
[3] R1-1903705, "Feature Lead's Summary #2 on Channel Access Procedures" 3GPP TSG RAN WG1 Meeting #96, Athens, Greece, Feb. 25-Mar. 1, 2019.

The invention claimed is:

1. A method performed by a user equipment (UE) for handling communication in a wireless communication network, the method comprising:
  initiating conditional transmission of a physical uplink control channel (PUCCH) to a radio network node of the wireless communication network, wherein the PUCCH contains uplink control information (UCI) and the transmission is conditioned on successful performance by the UE of a Listen-Before-Talk (LBT) procedure on an unlicensed carrier to be used for the transmission; and
  adjusting a contention window size (CWS) of the LBT procedure by
    resetting the CWS to a first value, responsive to determining that the radio network node responds within a time period from the initiation of the transmission in a manner that is consistent with the radio network node acting on the UCI; or
    increasing the CWS to a next value, responsive to determining that the radio network node does not respond within the time period in the manner that is consistent with the radio network node acting on the UCI.

2. The method according to claim 1, wherein the unlicensed carrier is a secondary cell (SCell) uplink carrier.

3. The method according to claim 1, wherein at least one of:
  the next value is higher than a current value for the CWS; or
  the first value is a minimum value for the CWS.

4. The method according to claim 1, wherein the UCI comprises a scheduling request (SR), and wherein the UE determines whether the radio network node responds in the manner consistent with the radio network node acting on the SR by determining whether the UE receives a corresponding uplink scheduling grant from the radio network node within the time period.

5. The method according to claim 1, wherein the UCI comprises hybrid automatic repeat request acknowledge (HARQ-ACK) information, and wherein the UE determines whether the radio network node responds in the manner consistent with the radio network node acting on the HARQ-ACK information by determining whether downlink scheduling information sent by the radio network node for the UE within the time period is consistent with the HARQ-ACK information.

6. A method performed by a radio network node for handling communication in a wireless communication network, the method comprising:
  deciding to enable an adjustment function at each of one or more user equipments (UEs), wherein, when the adjustment function is enabled, each such UE, when attempting transmission of a physical uplink control channel (PUCCH) on an unlicensed carrier, conditions the transmission on successful performance of a Listen-Before-Talk (LBT) procedure, with the UE inferring whether the LBT procedure was successful or unsuccessful based on whether the radio network node responds within a time period from the conditional transmission in a manner that is consistent with the radio network node acting on uplink control channel information (UCI) included in the PUCCH, and wherein the adjustment function comprises the UE resetting a contention window (CW) of the LBT procedure to a first size responsive to inferring a successful LBT for the conditional transmission and setting the CW of the LBT to a next size responsive to inferring an unsuccessful LBT for the conditional transmission; and
  configuring the one or more UEs, to enable the adjustment function.

7. The method according to claim 6, wherein the configuring is per at least one of UE, cell, carrier, bandwidth part, channel, or subband.

8. The method according to claim 6, wherein deciding whether to enable the adjustment function comprises determining whether a measured load of PUCCH transmissions is above or below a threshold.

9. The method according to claim 8, wherein the radio network node decides to enable the adjustment function in response to the measured load being above the threshold.

10. The method according to claim 8, wherein the radio network node decides not to enable the adjustment function in response to the measured load being below the threshold or another threshold.

11. The method according to claim 6, wherein the unlicensed carrier is a secondary cell (SCell) carrier with respect to the one or more UEs.

12. A user equipment (UE) for handling communication in a wireless communication network, wherein the UE comprises:
   a communication interface configured for communicating with a radio network node of the wireless communication network; and
   processing circuitry operatively associated with the communication interface and configured to:
      initiate conditional transmission of a physical uplink control channel (PUCCH) to the radio network node, wherein the PUCCH contains uplink control information (UCI) and the transmission is conditioned on successful performance by the UE of a Listen-Before-Talk (LBT) procedure on an unlicensed carrier to be used for the transmission; and
      adjust a contention window size (CWS) of the LBT procedure
         by resetting the CWS to a first value, responsive to determining that the radio network node responds within a time period from the initiation of the transmission in a manner that is consistent with the radio network node acting on the UCI; and
         increasing the CWS to a next value, responsive to determining that the radio network node does not respond within the time period in the manner that is consistent with the radio network node acting on the UCI.

13. The UE according to claim 12, wherein the unlicensed carrier is a secondary cell (SCell) uplink carrier.

14. The UE according to claim 12, wherein at least one of:
   the next value is higher than a current value for the CWS, or
   the first value is a minimum value for the CWS.

15. The UE according to claim 12, wherein the UCI comprises a scheduling request (SR), and wherein the UE determines whether the radio network node responds in the manner consistent with the radio network node acting on the SR by determining whether the UE receives a corresponding uplink scheduling grant from the radio network node within the time period.

16. The UE according to claim 12, wherein the UCI comprises hybrid automatic repeat request acknowledge (HARQ-ACK) information, and wherein the UE determines whether the radio network node responds in the manner consistent with the radio network node acting on the HARQ-ACK information by determining whether downlink scheduling information sent by the radio network node for the UE within the time period is consistent with the HARQ-ACK information.

17. A radio network node for handling communication in a wireless communication network, wherein the radio network node comprises:
   a communication interface configured for communicating with user equipments (UEs);
   processing circuitry operatively associated with the communication interface and configured to:
      decide to enable an adjustment function at each of one or more UEs, wherein, when the adjustment function is enabled, each such UE, when attempting transmission of a physical uplink control channel (PUCCH) on an unlicensed carrier, conditions the transmission on successful performance of a Listen-Before-Talk (LBT) procedure, with the UE inferring whether the LBT procedure was successful or unsuccessful based on whether the radio network node responds within a time period from the conditional transmission in a manner that is consistent with the radio network node acting on uplink control channel information (UCI) included in the PUCCH, and wherein the adjustment function comprises the UE resetting a contention window (CW) of the LBT procedure to a first size responsive to inferring a successful LBT for the conditional transmission and setting the CW of the LBT to a next size responsive to inferring an unsuccessful LBT for the conditional transmission; and
      configure the one or more UEs, to enable the adjustment function.

* * * * *